Feb. 16, 1960  C. F. HOOFER  2,924,900
SNAP-ON PRICE TAG HOLDER
Filed April 29, 1958
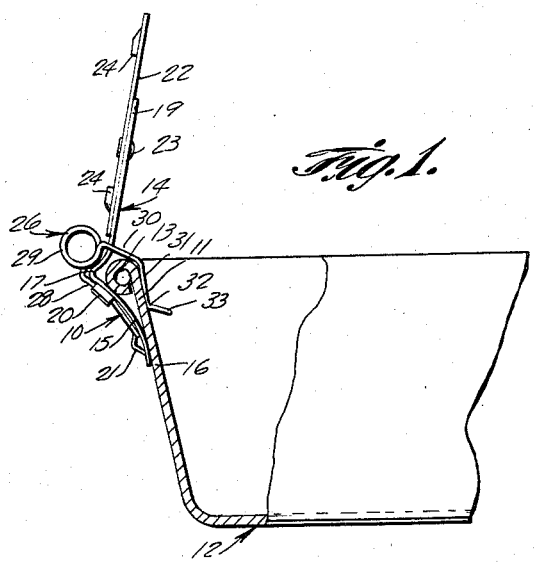
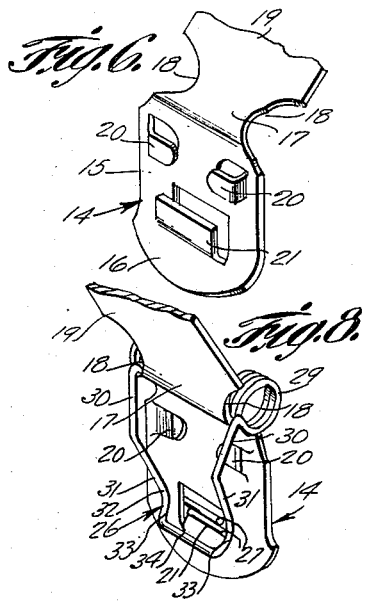
INVENTOR.
Charles Frederick Hoofer
BY Victor J. Evans & Co.
ATTORNEYS

United States Patent Office 2,924,900
Patented Feb. 16, 1960

2,924,900

SNAP-ON PRICE TAG HOLDER

Charles Frederick Hoofer, Chicago, Ill.

Application April 29, 1958, Serial No. 731,771

1 Claim. (Cl. 40—11)

This invention relates to a holder for price tags, indicia members such as numerals or the like, and more particularly to a holder which is adapted to be connected to a tray or pan which has various types of merchandise or material therein.

The object of the invention is to provide a snap-on price tag holder which is adapted to be releasably connected to the edge of a tray or pan, whereby various types of indicia such as prices or numerals can be readily displayed adjacent to the pan which has the merchandise or other material therein.

A still further object of the invention is to provide a snap-on price tag holder which is constructed so that the prices can be readily changed as desired, and wherein the device can be readily removed from or attached to the tray or pan, the device being constructed so that it can be fitted on pans or trays of different sizes or shapes, and wherein the holder of the present invention includes a base which can be flexed or adjusted so that the position of the prices or indicia members can be changed as desired, and wherein the price tag support of the present invention is constructed so that it complies with various public health regulations.

A further object of the invention is to provide a snap-on price tag holder of the foregoing type which is of relatively simple and sturdy construction, and one which is comparatively inexpensive to manufacture and easy to use.

The above and other objects and advantages of the invention will appear from the following description and appended claims when considered in connection with the accompanying drawings forming a part of this specification wherein like reference characters designate corresponding parts in the several views.

In said drawings:

Figure 1 is an elevational view illustrating the snap-on price tag holder of the present invention mounted on an edge of a tray, with parts of the tray broken away and in section.

Figure 2 is a view taken at right angles to the view shown in Figure 1, and showing the snap-on price tag holder removed from the tray.

Figure 3 is a view showing the opposite side from that shown in Figure 2.

Figure 4 is a sectional view taken on the line 4—4 of Figure 2.

Figure 5 is a sectional view taken on the line 5—5 of Figure 2.

Figure 6 is a fragmentary perspective view showing the base, and illustrating the lugs before the lugs are bent inwardly to hold the spring member in place.

Figure 7 is a perspective view illustrating the spring member.

Figure 8 is a perspective view showing the spring member attached to the base, and with parts broken away and in section.

Referring in detail to the drawings, it will be seen that there has been provided a snap-on price tag holder which is an improvement over the devices shown in my prior patents, such as my prior Patents Nos. 2,826,841, 2,679,121, and 2,276,490.

Referring in detail to the drawings, the numeral 10 designates the snap-on price tag holder of the present invention, and the holder 10 is shown mounted on the edge 11 of a tray or pan 12, and the tray 12 is provided with an upper outer bead or rim 13. The tray 12 is adapted to hold any suitable type of material such as food products, and the tray 12 may be arranged in a refrigerator or other area or location.

The holder 10 of the present invention includes a base which is indicated generally by the numeral 14, and the base 14 is adapted to be made of a suitable material such as thin metal. The base 14 includes a first section 15 which has a curved formation as for example as shown in Figure 1, and the lower edge of the section 15 is shaped to define a lip 16.

The base 14 is of one-piece construction and includes a second section 17 which is arranged angularly with respect to the first section 15, and the second section 17 is provided with diametrically opposed recesses or cutouts 18 which impart to the section 17 a small amount of flexibility so that the base 14 can have its third section 19 shifted slightly or moved slightly as desired.

The first section 15 of the base 14 is provided with first and second struckout lugs 20 and a third struckout lug 21.

Arranged contiguous to the third section 19 of the base 14 is a rectangular plate 22, and the plate 22 is secured to the section 19 in any suitable manner, as for example by means of securing elements or rivets 23. The plate 22 is provided with a plurality of struckout projections or lugs 24 whereby indicia members or numerals such as the numerals 25 can be releasably connected to the projections 24 so that the members or numerals 25 can be conveniently displayed, as for example as shown in Figure 2. Thus, the numerals 25 can be used for indicating the price of the material in the tray 12.

There is further provided a spring member which is indicated generally by the numeral 26, Figure 7, and the spring member 26 includes a first pair of portions 27 which are arranged in overlapping relation with respect to each other, and the portions 27 are arranged in engagement with the lug 21. The portions 27 terminate in a pair of spaced parallel second portions 28, and the portions 28 each terminates in a coiled portion 29. The portions 29 terminate in third portions 30, and the pair of third portions 30 are arranged in spaced parallel relation with respect to each other. The third portions 30 terminate in fourth portions 31, and the portions 31 are arranged angularly with respect to the portions 30. The portions 31 terminate in fifth portions 32 which act as bearing surfaces, and the fifth portions 32 terminates in sixth portions 33, the portions 33 being arranged angularly with respect to the portions 31. A seventh portion 34 extends between the pair of sixth portions 33. It is to be noted that the spring member 26 is made from a single piece of suitable material.

As shown in Figure 1 for example, it will be seen that the section 15 is arranged on the opposite side of the edge 11 from portions of the spring member.

From the foregoing, it is apparent that there has been provided a snap-on price tag holder which is an improvement over other similar devices such as that shown in any of my prior patents, such as my prior Patent Nos. 2,826,841, 2,679,121, and 2,276,490.

It is to be noted that with the present invention, the bearing surfaces or portions 32 and the adjacent portions of the spring member can be moved away from the section 15 so that the device can be mounted on the edge 11 of the tray 12 as shown in Figure 1. Then, when pressure is released, the coiled portion 29 will urge the bearing surfaces 32 into engagement with the edge 11 so that the device will be maintained clamped on the edge of the tray. The coiled portions 29 maintain sufficient pressure on the bearing surfaces 32 so that the device will not accidentally slip or move from its proper place on the tray. Furthermore, due to the provision of the outwardly extending or flaring portions 33 as well as the portion 34, it will be seen that the flaring portions 33 coact with the oppositely extending lip 16 to provide a flaring mouth or construction which facilitates the insertion of the device on the edge 11 of the tray 12. The portions 34 and 33 are also arranged so that the manual gripping thereof is facilitated, and the portions 27 of the spring member 26 are connected to the lugs 21. In Figure 6 the lugs 20 and 21 are shown before they are bent, and initially when the portions 27 and 28 are arranged in engagement with the lugs, these lugs are in the position shown in Figure 6, and then the lugs 20 and 21 are bent inwardly so as to securely fasten or retain the base 14 and spring member 26 connected together so that accidental separation of the base from the spring member is prevented.

Furthermore, portions 30 and 31 are arranged angularly with respect to each other, and this arrangement insures that there will be a snug fit over a bead or rim such as the rim 13. The section 17 of the base 14 is recessed as at 18 so that the section 17 is made slightly flexible whereby the section 19 can be manually bent or moved slightly so that the plate 22 can be arranged at different angular positions as desired. The plate 22 is secured to the section 19 by suitable securing elements such as the rivets 23, and the plate 22 is provided with a plurality of struckout portions or projections 24 whereby indicia members or numerals such as the numerals 25 can be releasably connected to or arranged in engagement with the projections 24. The numerals 25 are adapted to be used for indicating prices of the merchandise being displayed in the tray 12.

The parts can be made of any suitable material and in different shapes or sizes. The members 25 are arranged adjacent the front face of the plate 22 and in Figure 2 these numbers have been shown in dotted lines so as not to obscure any of the constructional details of the present invention. An important feature of the present invention is the construction of the spring member and the lugs which hold it in place.

Thus, it will be seen that there has been provided a snap-on price tag holder which is adapted to be used for supporting price tags on the edges of pans, plates, trays and the like, as for example pans in which bakery items are displayed in counters, and with the parts arranged as shown in the drawings, the prices 25 can be conviently displayed above an edge of the pan. Thus, the present invention provides a price card support which will hold the prices or cards in an upright position and wherein the device is capable of flexible adjustment since the section 17 can be readily bent due to the provision of the notches or cutouts 18. The double coil torsion spring member 26 has portions thereof adapted to snap over the edge of the tray and the spring member is adjustable so that it will grip pans or containers having edges of different types or designs. Furthermore, the tray or pan gripping elements are arranged so that they can be easily handled by sales personnel and wherein the price tag support will comply with all of the various public health regulations or requirements. As shown in the drawings, the cutouts 18 also provide clearings for the adjacent portions of the spring member such as the portions 30. The base 14 is made from thin metal so that it can be readily bent or shaped whereby the prices will be in the desired perpendicular positions.

Minor changes in shape, size and rearrangement of details coming within the field of invention claimed may be resorted to in actual practice, if desired.

I claim:

A card holder comprising, a base including a first section of curved formation, first, second and third lugs struck-out from said first section, said first and second lugs being arranged in opposed relation with respect to each other, said third lugs being spaced below said first and second lugs, said base further including a second section terminating in an upstanding third section, a spring member including a pair of first portions arranged in overlapping relation with respect to each other and said first portions engaging said third lug, said spring member further including spaced apart second portions engaging said first and second lugs, said second portions terminating in coiled portions which are arranged contiguous to the second sections of said base, third portions extending from said coiled portions, said third portions being arranged in spaced parallel relation with respect to each other, said third portions terminating in angularly arranged fourth portions, said fourth portions terminating in fifth portions which define bearing surfaces, said fifth portions terminating the sixth portions which are arranged angularly with respect to said fourth portions, and a seventh portion extending between the pair of sixth portions, the first section of the base adapted to be arranged on the opposite side of the edge of a tray or pan from portions of the spring member, the second section of the base being provided with diametrically opposed recesses therein which impart to the second section a small amount of flexibility, and means on said second section for holding a card thereon.

References Cited in the file of this patent

UNITED STATES PATENTS

| | | |
|---|---|---|
| 1,133,388 | Merrill | Mar. 30, 1915 |
| 2,679,121 | Hoofer | May 25, 1954 |
| 2,826,841 | Hoofer | Mar. 18, 1958 |